May 3, 1966 W. E. VOISINET ETAL 3,249,486
METHOD AND APPARATUS FOR PRODUCING FOAMED SYNTHETIC RESINS
Filed June 29, 1962 4 Sheets-Sheet 1

INVENTORS
Walter E. Voisinet
BY Elmer M. Melling

Robert F. Hause
ATTORNEY

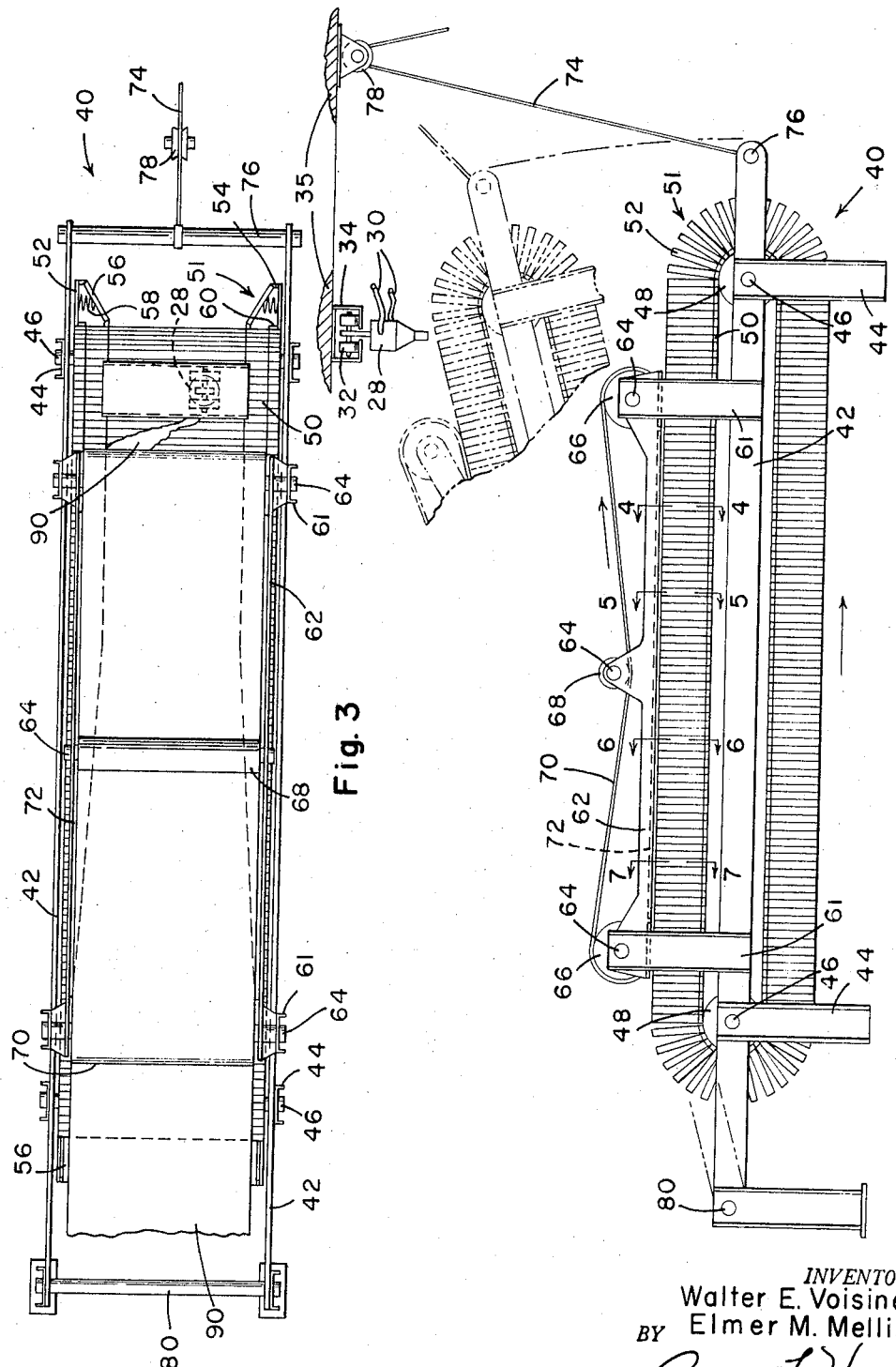

*INVENTORS*
Walter E. Voisinet
Elmer M. Melling
BY
Robert F. Hause
ATTORNEY

United States Patent Office 3,249,486
Patented May 3, 1966

3,249,486
METHOD AND APPARATUS FOR PRODUCING
FOAMED SYNTHETIC RESINS
Walter E. Voisinet, Buffalo, and Elmer Michael Melling, Kenmore, N.Y., assignors to National Gypsum Company, Buffalo, N.Y., a corporation of Delaware
Filed June 29, 1962, Ser. No. 207,458
21 Claims. (Cl. 161—165)

This application is a continuation-in-part of the prior application of Walter E. Voisinet and Elmer M. Melling, Serial No. 117,100, filed June 14, 1961, which was a continuation-in-part of the application of Walter E. Voisinet and Donald G. Hamme, Serial No. 728,615, filed April 15, 1958, both said applications being now abandoned.

This invention relates to foamed, cellular, synthetic resins, herein referred to as foams, especially urethane foams, and to methods and apparatus for manufacturing urethane foams which possess heretofore unattainable uniformity and dimensional stability, even at very low densities. It is also concerned with closed cell, low density, rigid urethane foam cast blocks having isotropic properties which afford unique low temperature characteristics.

Urethane foams are generally defined as expanded cellular products produced by the interaction of a polyhydroxyl compound, a blowing agent and a polyisocyanate. Depending upon the choice of polyhydroxyl compound, the foams can be made rigid or flexible. The structure of flexible urethane foams consists of a network of cells of substantially uniform character which are essentially open and interconnecting. In rigid foams the cell structure is closed. For certain uses of rigid foams, such as thermal insulation, substantially uniform cell structure is desired in order to provide uniform strength and compressive yield strength characteristics which are substantially the same along X, Y and Z direction axes along which a force is applied (isotropicity).

A urethane foam of uniform strength and uniform cell structure has long been sought, but the problem of making such foams satisfactorily has always been troublesome, especially where the foam was of very low density and the foamed product was relatively thick and wide blocks. Relatively thick blocks of low density urethane foams (of the order of about less than four pounds per cubic foot) heretofore lacked uniform structure, and consequently dimensional stability, and were therefore suitable only for very limited use.

For example, tests on a typical relatively thick block (6" wide and 6" thick) low density rigid urethane foam revealed that although it had a compressive strength of 30 p.s.i. measured parallel to one axis, its strength perpendicular to such axis was as low as 12 p.s.i. Although the compressive strength along one axis may be more than sufficient for any given application, the use and dimensional stability of the foam is effectively limited by the lower strength measured along another axis, thereby making the foam ineffective for certain uses. This is particularly illustrated in thermal insulation formed by shaping blocks of urethane foam to form-fit piping, valves, fittings and the like. If the insulation is made from a block of foam, or foamed-in-place, using a low density (1.5-2 lb./cu. ft.) non-isotropic foam, the insulation would distort and collapse at low temperatures.

Polyurethane foams are cellular synthetic polymers characterized by the

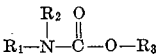

or urethane linkage, and are generally formed by the polymerization of a polyisocyanate, such as 2,4-tolylene diisocyanate, with an hydroxyl rich polyester or polyether resin or polyol. These compounds are will known in the art, and are commercially available under a variety of trade names and trademarks.

Normally, a portion of the resin is mixed with an excess of diisocyanate to form a prepolymer or partial prepolymer in one mixing tank, and then this prepolymer is mixed with the remaining resin and a suitable catalyst in a continuous mixing head preferably of a so-called high shear type, whence it is deposited on suitable retaining means and the foaming process begins. The foaming may result from the expansion of an inert, latently vaporizable blowing agent dissolved in the reactants, which in turn may be vaporized either by the heat of the polymerization reaction or merely by the reduction of pressure attendant to a release into the atmosphere. Foaming may also result from the liberation of a gas as a reaction product, such as carbon dioxide, formed by the reaction between an excess of diisocyanate and water. Conceivably, foaming could result from a combination of both of these causes.

Immediately upon, or shortly after, being deposited in a mold or forming apparatus adapted to provide relatively thick blocks of rigid foam, the mixture is analogous to a true liquid, which expands equally in all directions, and therefore the cells formed by the evolving gas tend to be roughly spherical in shape and of approximately the same size.

As the exothermic polymerization process proceeds, however, certain factors come into play, which adversely affect further uniform expansion, and which, unless corrected for, as in accordance with the present invention, cause uneven and irregular expansion of foam cells, and may result in a relatively large number of strained cells.

The first factor is that processes previously used employed molds or forms with fixed sidewalls, which served mechanically to restrict expansion solely to upward, unidirectional expansion. The second is that as the foam begins to gel, its viscosity increases and varies throughout because of temperature gradients. The heat retained at the center of the foam by its inherent insulation properties serves to keep the central mass in a plastic condition for a longer time, and therefore to allow for greater expansion in this region.

In addition to those adverse factors causing irregularities in cell size and structure, it is apparent from test data that a higher degree of orthotropicity results from this process than is explainable merely by reason of cell shape itself. The expansion of the foaming material during the plastic phase of its curing or setting, that is, during the cross-linking of molecules into the three-dimensional structure which characterizes thermosetting resins, appears to be critical insofar as physical stresses which appear to be set up in this curing period adversely affect the uniformity of compressive strengths, measured along various axes. The internal expanding forces, unlike in a true fluid, cannot act uniformly in all directions but only in the direction of rise, i.e., the path of least resistance to foam expansion. The ability of the process of the present invention to relieve and balance these stresses appears to contribute substantially to the uniformity which is clearly demonstrable by reference to the data herein.

It is known in the art that a given polyurethane foam formulation will exhibit certain compressive yield strength characteristics such that the total of strengths measured along three mutually perpendicular axes, when added together, will be substantially constant, although there may be considerable variation between the individual figures. Thus, if the figures along three axes, respectively, for a formulation are 15, 30 and 45, totaling 90, the same formulation will yield, in an isotropic foam, strengths of about 30, 30 and 30, respectively. Whereas applicants do not wish to be limited to any particular explanation of the greatly improved isotropicity of their novel product, it appears that the distribution of stresses during this critical plastic deformation of the later stage of expansion is a highly important feature of the invention, and one which distinguishes it from prior practice in the polyurethane foam art.

The excessive free rise of the foam in a vertical direction relative to its limited horizontal expansion is caused by its inability to expand horizontally against the restraining sides of the forming mold and thereby relieve the stresses set up by operation of the expansive forces. This excessive vertical free rise is the underlying cause of the lack of uniform structural strength of the finished foam, and this is true whether or not the product is subsequently cut into square or rectangular blocks. The familiar "loafing" phenomenon exhibited by relatively thick blocks of such foam indicates the extent to which this undesired expansion occurs. This loafing is commonly referred to in literature on the subject of synthetic resin foam. Cells assuming their final shape during undue vertical expansion, as described above, may actually become relatively long and irregular, rather than circular, when viewed in cross-section. The resulting strained cells lack the isotropic property of spherical cells, and hence are structurally weak and easily collapsed upon the application of force perpendicular to their longitudinal axis. Even where a distorted cell shape is not evident, however, the stresses set up during foaming can have the adverse effect described above, which may cause a slight thinning of the cell wall in the direction of vertical rise.

In the case of foams in which the blowing agents are low molecular weight fluorocarbons ("Freon"), for example, an additional factor has heretofore contributed to the lack of structural strength. It has been observed that where foams of a density of about two pounds or less per cubic foot were subjected to low temperatures, encountered, for example, where rigid foam is used as thermal insulation, that the foams would, in some cases, actually collapse. This loss of shape with lowered temperature is attributable to the vacuum formed in the cells when the ambient temperature lowers and the vapor pressure of the blowing agents is substantially reduced. Although this effect is most pronounced where gases with relatively low boiling points, such as "Freon," are used, as the blowing agents, it exists to some extent in all cases, simply because of the lowering of the vapor pressure of the entrapped gas which accompanies a lower temperature. It is therefore troublesome in any application where the use of Freon is dictated for economic reasons.

Rigid, low density (1.5 to 2.5 lbs./cu. ft.) urethane foams heretofore used, having a compressive strength in any axis of less than about 12 p.s.i., when cooled to about $-10°$ F., would collapse spontaneously. Although the more dense, stronger foams will not collapse, under the same conditions, this force is still present and tends to weaken the structure. The undesirable effect of this can be easily appreciated where foams which have relatively low strength along one axis, as described above, are placed in a low temperature environment. It can be seen as a corollary of these facts, that the only practical low density foam for use at low temperatures is one which possesses substantially equal strength along the X, Y and Z axes and at least sufficient strength in each axis to resist the crushing effect of atmospheric pressure.

In accordance with the instant invention there is provided a rigid urethane foam of low density which has markedly improved isotropic compressive strength, and a method and apparatus to be used in the manufacture of such improved foam.

Referring to the drawings:

FIGURE 2 is a side elevation of a modified form of the apparatus in accordance with the invention, including a section of the apparatus shown in an alternate position;

FIGURE 3 is a plan view of the apparatus of FIGURE 2;

Figure 8:
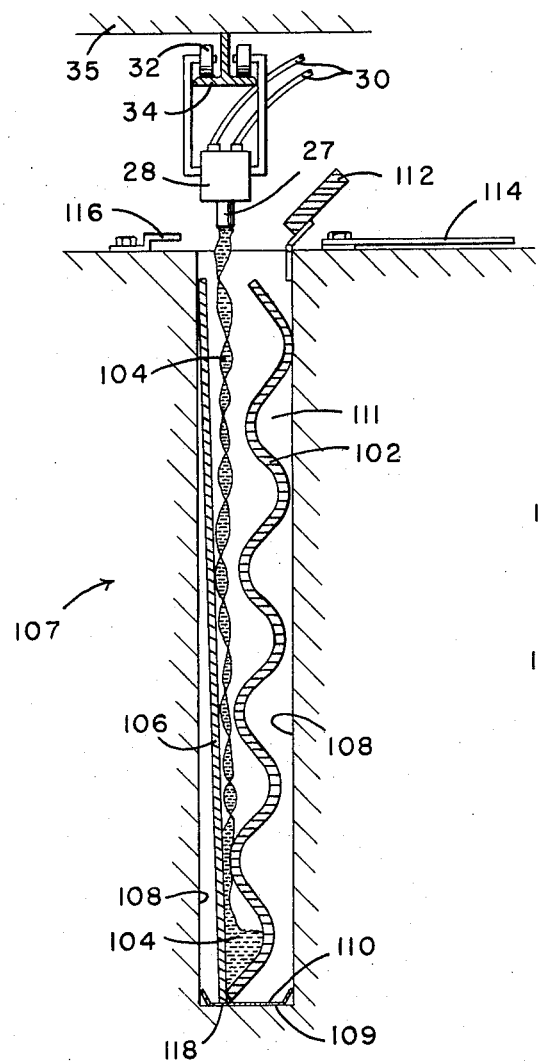
Figure 9:
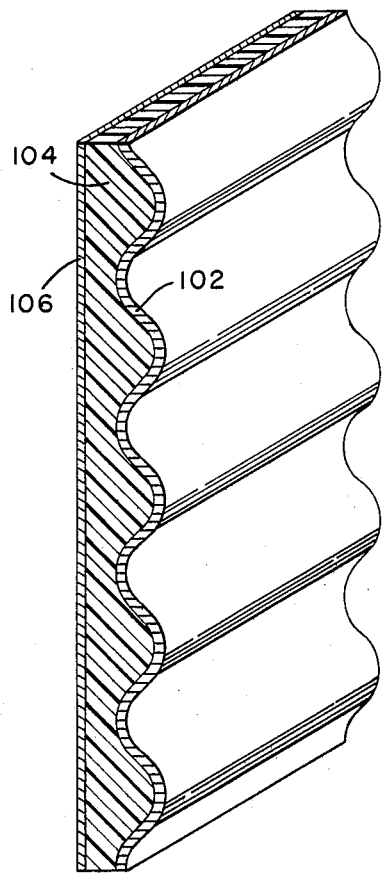

FIGURES 4, 5, 6 and 7 are sectional views taken respectively on lines 4—4, 5—5, 6—6 and 7—7 of FIGURE 2, and illustrate progressive steps in the process of the invention;

FIGURE 8 is a vertical section through a further modified apparatus of the invention; and FIGURE 9 is an isometric view of a product of the apparatus of FIGURE 8.

The present invention provides an isotropic rigid block urethane foam and a means for producing such foams by curbing the wasteful excessive free rise tendency of the foam, and at the same time takes advantage of the expansive energy of the reaction to achieve a foam of uniform low density and isotropic compressive strength. Broadly, the present invention includes, in general, means for limiting excessive free rise by allowing only a predetermined vertical expansion of a foaming mass, and also means for allowing subsequent horizontal expansion resulting in a lower density, such means allowing the foam to expand horizontally to reach whatever volume corresponds to the lower density desired.

A preferred embodiment of the method of the present invention consists of first preparing reactants to form a low density, rigid, dimensionally stable synthetic resin foam, generally in accordance with known prior practice, as follows:

Into one mixing tank is placed a mixture of 2,4- and 2,6-tolylene diisocyanates, in the ratio of 80% 2,4- and 20% 2,6-isomers, and about 30% to 40% of a stoichiometric quantity of a hydroxyl-rich polyester resin or polyether resin, or a mixture of both. One or more of these reacts with the polyisocyanate to form a semi-polymer. If a chlorofluoromethane blowing agent is used, it is placed in this tank also, preferably in liquid form.

Into a second mixing tank are placed the remainder of the polyester or polyether resin or a mixture of both resins, comprising approximately 60% to 70% of the total amount of such resin, a catalyst, such as N-methyl morpholine, or other common alkyl, aryl or heterocyclic amine and an emulsifier. The emulsifier may be either of a nonionic type, for example, a polyoxyethylated vegetable oil or equivalent or of an anionic type, for example, an alkyl aryl sulfonate, or a silicone. Example I lists the ingredients of a typical formulation.

*Example I*

| | Parts by weight |
|---|---|
| Polyoxypropylene triol (M.W. about 440 and hydroxyl number about 380) | 72.7 |
| Hexa functional oxypropylated sorbitol | 70.0 |
| Triethylene diamine | 0.9 |
| Tolylene diisocyanate (80%/20% mixture of 2,4- and 2,6-isomers) | 117.0 |
| Silicone resin | 0.9 |
| Trichloromonofluoromethane | 43.0 |

(The prepolymer consists of the above tolylene diisocyanate and about 44 parts of the triol)

The contents of the two tanks are appropriately mixed after being metered to a mixing head, whence they are deposited. Subsequent to deposition, the blowing agent is volatilized by the exothermic reaction which completes polymerization between the prepolymer and resins supplied from the mixing tanks.

The foaming reactants are then deposited in a novel means for molding or forming, embodying a relatively fixed top restraining means and rigid but resiliently mounted, and hence movable, lateral restraining means in conjunction therewith. In this manner, after the foaming mixture has undergone sufficient vertical expansion to contact the top restraining means, the resiliently mounted lateral restraining means still provide a degree of freedom for further expansion. This expansion must therefore be substantially horizontal and occurs as the expansion force overcomes the resistance afforded by the resilient lateral restraining means, and moves the lateral restraining means outward to any suitable limit. This controlled expansion prevents the cells of the foam from becoming distended vertically. Their enlargement under the expansive force while in a plastic state is kept uniform and in this way the structural defects which were inherent in prior foams of low density, and which therefore greatly limited the usefulness of such foams, have been eliminated. This process of controlled expansion may be continued to a degree sufficient to provide a surface area to volume ratio necessary to obtain any desired lower density from about four pounds per cubic foot down to about one pound per cubic foot. A final portion of the process may include final expansion at both the top and the sides, calibrating the relative movement of the side and top restraints to achieve a foam characterized by relatively small cells of uniform, largely circular, cross-section. A certain amount of control is also afforded by preventing, for example, free rearward expansion. This may be done by inclining the floor of the restraining means forwardly so that rearward expansion of the foam periphery is opposed by gravity.

Methods previously used in the manufacture of foams were of two general types. One method was practiced by fixedly restraining the foam on all sides, and the other method allowed completely free expansion, along at least one axis, normally the vertical axis. The practice of restraining the expansion of the foam on all sides has the advantage of tending to produce a uniform foam, but it results in a foam that is relatively too dense for use in lightweight applications. The free rise, low density, foams were characteristically irregular, both as to density and strength, and therefore were unsatisfactory.

It will readily be seen that the critical and essential difference between the previous practice and the method of the present invention is control of the foaming action to offset the natural tendency of the foam to expand in the direction of least resistance, and that this close control gives a rigid foam which has the desirable qualities of uniformity and strength previously thought attainable only in foams of much greater density.

Rigid urethane foams produced in accordance with the invention have completely resisted shrinkage at temperatures as low as −10° F., even with densities of the order of about one and one-half pounds per cubic foot, whereas such foams produced by prior methods shrank appreciably or collapsed when subjected to the same conditions. Laboratory tests revealed that the products of the process of the invention exhibited isotropic compressive strength throughout a wide temperature range and far greater uniformity than foams produced by any prior method.

Figure 1:
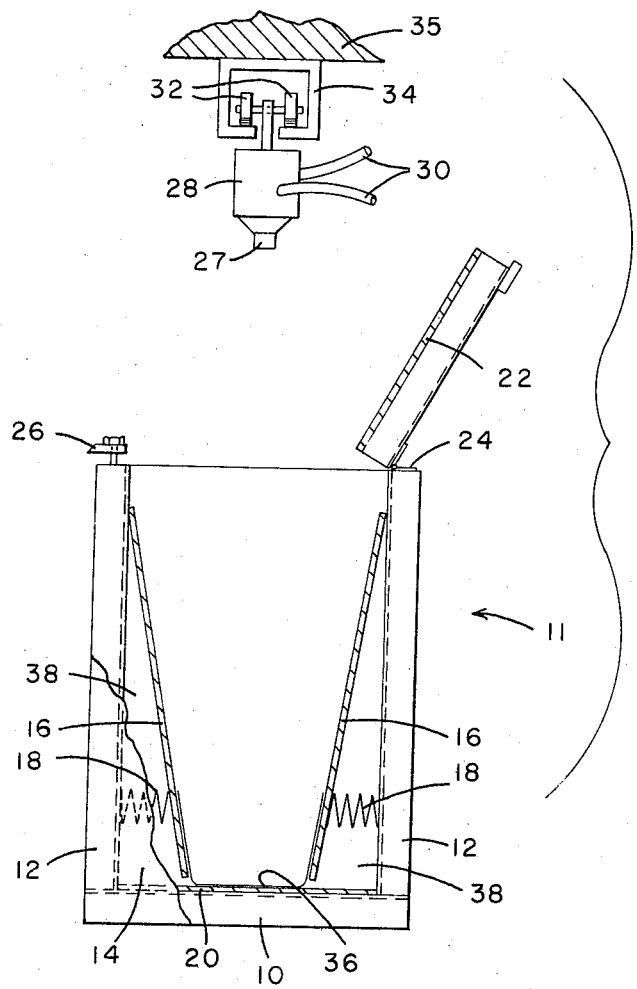
FIGURE 1 is an end view, with portions broken away, of an apparatus in accordance with the invention.
Figure 1A:
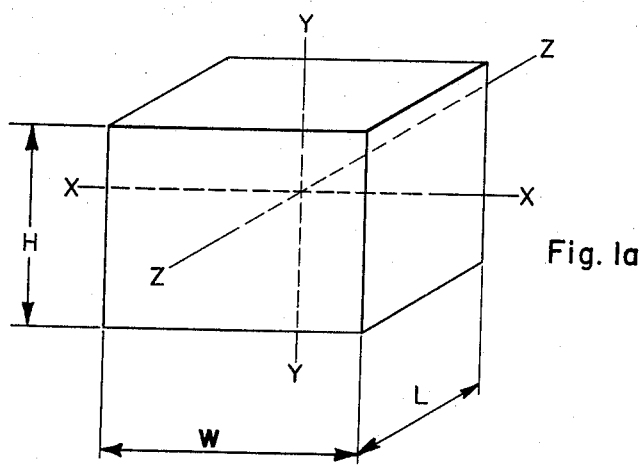
FIGURE 1a is a diagrammatic illustration of the isotropic features of the rigid block urethane foams of this invention.

Three modifications of preferred embodiments of apparatus built in accordance with the invention are shown in the drawings. Referring to FIGURE 1, there is shown a hollow rectangular box 11, including a rigid bottom 10, and fixed upwardly extending sides 12, and end walls 14. Disposed within box 11 are two opposed rigid, but resiliently mounted, inner sidewalls 16, each disposed with the bottom edge thereof inwardly of the box relative to the top edge, thus angled inwardly and downwardly. Inner sidewalls 16 are retained in angled position by pressure responsive springs 18 allowing movement of the inner sidewalls 16 from their angled position to a position adjacent the outer sides 12. Movement of the inner sidewalls 16 is thus accomplished by compressing the pressure responsive springs 18. The inner bottom surface of the mold is formed by a rigid bottom plate 20 disposed above and tangent to the outer bottom 10.

Disposed across the top of the cavity thus formed is a cover plate 22, hingedly mounted on a hinge 24, disposed to be secured horizontally to close the top of box 11 and to be locked by a plurality of locking lugs 26.

A mixing head 28, including a plurality of feed hoses 30, is mounted to movably traverse the length of the box 11, supported by rollers 32 mounted upon an overhead track 34 which in turn is affixed to a ceiling 35.

The interior surfaces of box 11 in the preferred form are protected with release paper or coated with any common mold release agent to prevent adhesion of the foam to the mold. Even when the mold is not covered entirely with such paper, the bottom paper sheet 36 is retained to prevent expansion or seepage of the foam into the spaces 38 between the box sides 12 and the inner sidewalls 16.

A second embodiment of the invention is depicted in FIGURES 2 and 3, which show an apparatus 40 generally resembling a conveyor but modified to control, in accordance with the invention, the expansion of material deposited at the feed end, passing therethrough, and emerging at the discharge end.

Figure 4:
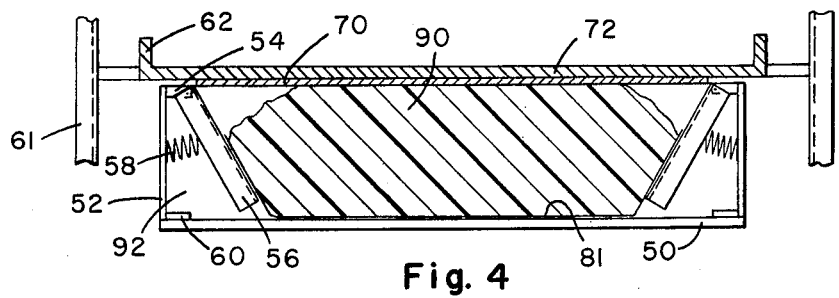
Figure 7:
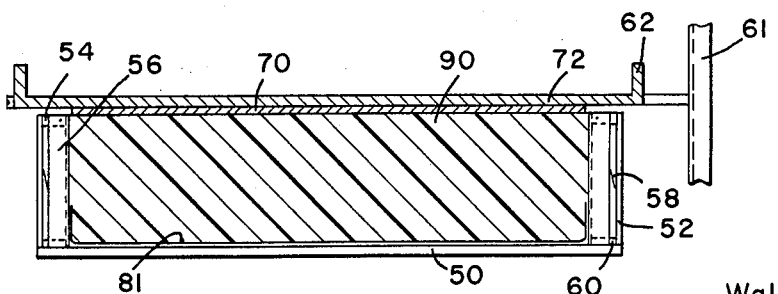

Horizontal frame members 42 and vertical frame members 44, supporting two opposed rotatable shafts 46 on which driving gears 48 are mounted and adapted to move a large plurality of continuously linked conveyor bed segments 50, which so linked form a complete segmented conveyor belt 51. Extending upwardly from each lateral edge of the segments 50 are fixed vertical arms 52. Short lateral supports 54 are mounted atop each arm 52 for hingedly supporting sidewall sections 56. Sidewall sections 56 are adapted to shift outwardly at the lower ends from an inclined position as shown in FIGURE 4 to a vertical position parallel to the vertical arms 52 as shown in FIGURE 7, when sufficiently forced to overcome the resistance of the springs 58, until by such outward shifting the sidewall sections abut the sidewall stops 60.

Disposed above the conveyor-type assembly is an overhead frame 62, supported by and kept parallel to and at a fixed distance from the lower conveyor-type assembly by vertical channels 61 which extends between the horizontal frame members 42 and the upper lateral roller support shafts 64. The overhead frame 62 supports three upper lateral roller support shafts 64, two of which support belt rollers 66, and a third which supports a central idler roller 68, adapted to maintain tension on the overhead belt 70. The belt 70 passes below and in contact with a rigid top plate 72, which extends between either side of, and is supported by, the overhead frame 62, the top plate thereby preventing vertical movement of the belt 70.

The entire mechanism may, as shown in the alternate position of FIGURE 2, be raised on one end to obviate the possibility of rearward foaming, by the action of a hoist cable 74 anchored at the center of the feed end frame spacing rod 65, and running over the hoist cable stationary pulley 78 affixed to the ceiling 35. The horizontal frame member 42 pivots on the discharge end from spacing rod 80. The driving gears 48 are appropriately synchronized with the belt rollers 66 so that the belt 70 and the conveyor bed segments 50 comprising the lower conveyor belt 51 move past a given point at the same rate.

Figure 5:
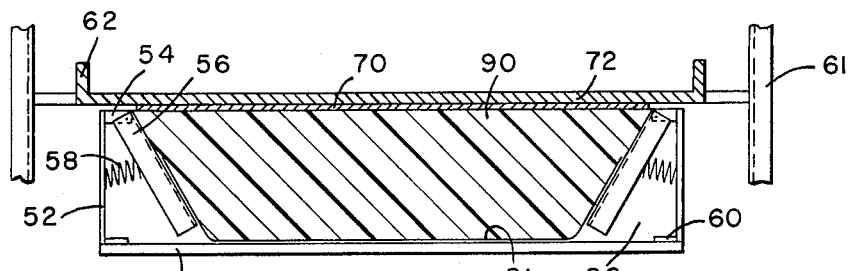
Figure 6:
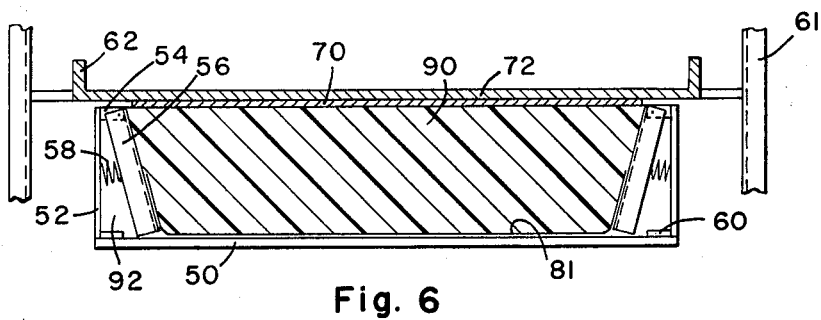

It will be appreciated that the sidewall sections 56 on each side, the bed elements 50, and the overhead belt 70 together form the four movable interior sides of a chamber to enclose totally any material passing along the conveyor, and that all are stationary with respect to one another while moving parallel to the horizontal frame members 42 between the driving gears 48. The cross-sectional configuration of the interior of the chamber changes from time to time during the process, as may be seen by reference to FIGURES 4, 5, 6 and 7. These figures show cross-sections of the foam and expansion control means. FIGURE 4 shows the process shortly after the foam 90 has been deposited, and has not yet entirely filled the cavity. FIGURE 5 depicts the foaming process at the point the entire cavity has been filled, but prior to the time the foaming mass has attained its final volume. FIGURES 6 and 7 show the last phases, namely, further lateral expansion and assumption of a rectangular shape, respectively. The locations of these sectional views in relation to the overall process are shown by reference to FIGURE 2.

A release or expandible paper bottom cover 81 extends a distance up the sidewall sections 56 and between them along the bed segments 50 to prevent seepage into the cavity 92 between the sidewall sections 56 and the vertical arms 52.

Disposed over the conveyor assembly near the feed end is a mixing head 28 of the same type shown in FIGURE 1, having a plurality of feed hoses 30 attached thereto for supplying chemical reactants. The mixing head 28 is mounted on support rollers 32 and is adapted to reciprocate laterally on a supporting overhead track 34 fixedly attached to the ceiling 35. Foaming reactants 90 fed from the mixing head 28 are deposited in a substantially sinuous pattern on the forwardly advancing bed segments 50 as shown.

In an illustrative specific embodiment of this invention, the foaming reactants prepared as hereinbefore described were processed in an apparatus illustrated in FIGURES 2 and 3. The machine employed in casting a rigid polyurethane foam block had a cross-section transverse to the machine direction (which controlled the final cross-section configuration of the foam block), 52" x 14", that is, a block of about 720 square inches in cross-sectional area. In testing the physical characteristics of the resultant foam, conventional test procedures were used. The properties of this block are tabularly summarized in Table I.

TABLE I

*Rigid urethane foam physical properties and performance characteristics*

| | Foam A |
|---|---|
| Density (lbs./cu. ft.) | 1.5–1.65 |
| "k" Factor (B.t.u./in. thickness/° F./hr./s. ft.) (@ mean temperature of 75° F.) | .145 |
| Closed cells (percent) | 93 |
| Moisture vapor permeability (perm.-inches) | |
| Shear strength (p.s.i.) | 23 |
| Shear modulus (p.s.i.) | 300 |
| Compressive yield strength (p.s.i.) | |
|    Vertical (height=H) | 20 |
|    Horizontal (machine direction) (length=L) | 20 |
|    Horizontal (transverse to machine direction) (width=W) | 22 |
| Compressive modulus (p.s.i.) | 400 |
| Coefficient of linear expansion | |
|   75° F. to −10° F. | |
|    Machine direction | .000047 |
|    Transverse to machine direction | −.000087 |
|   75° F. to 200° F. | |
|    Machine direction | .000040 |
|    Transverse to machine direction | .000112 |
| Total water immersion for 48 hours (under 10' head) | |
|   Percent linear change (max.) | 1.00 |
|   Volume of water absorbed (as percent of foam volume) | 2.50 |

A third embodiment consists of manufacturing the panel of FIGURE 9 by the method shown in FIGURE 8. Referring to FIGURE 8, the preferred process of making the panels of FIGURE 9 consists of placing the outer and the inner facing sheets 102 and 106 within a jig 107 having two fixed spaced vertical supports 108, 108 with a closed bottom 109 and closed ends 111. A hinged top 112 is pivotally mounted to close the top opening between the sheets 102 and 106, and locking levers 114 and locking lever clamps 116 are mounted atop supports 108, 108 to firmly lock top 112 in a closed position during the final part of the panel forming process.

The bottom 109, ends 111, and top 112 are covered with a strippable release paper or film 110, such as polyethylene film. The foaming of the formable polyurethane mixture is, thus, contained within the space between the sheets 102 and 106, by the bottom 109, ends 111 and top 112, without any substantial adhesion to these containing members covered by the strippable release paper 110. The jig 107 is constructed over-all to suitably withstand at least 7 pounds per square inch pressure of expansion during a foaming action therewithin.

In the preferred form shown in FIGURE 2, the sheets 102 and 106 are placed in the jig 107 on the side, longitudinal edges 118 of the sheets, with the bottom side edges of the two sheets disposed closely together, preferably touching one another and with the sheets tapering more widely apart progressively upwardly.

The foamable polyurethane mixture, shown at 104 in FIGURE 8, is poured and deposited within the space between sheets 102 and 106 by a nozzle 27 from a high speed mixing head 28 which is movable lengthwise of the jig to more evenly distribute the mixture 104 throughout the length thereof. The foamable polyurethane mixture, described more fully above, having been premixed substantially immediately before pouring from nozzle 27 from two prepared components pumped into the mixing head 28 by supply hoses 30, reacts shortly after being deposited, forming a stable foam which decreases in density and increases in volume by a factor of from about 20 to 80. For example, a preferred foamable polyurethane mixture of 80 pounds per cubic foot foams to a density of two pounds per cubic foot, decreasing in density and increasing in volume by a factor of about 40.

Sufficient foamable mixture 104 is deposited to completely fill, when foamed, the space between sheets 102 and 106 when sheets 102 and 106 are disposed tightly against their respective supports 108, 108. During the foaming process, and especially when the top cover 112 is encountered, substantial resistance to further expansion occurs. The entire mass of foaming material is, thus, still in a condition to foam further, and a substantial amount of energy is available to produce the further foaming. If the bottom edges 118 were originally disposed spaced apart as far as possible within the jig, all of the foaming action would necessarily be upward as explained hereinabove. When substantial resistance to such motion is built up, a substantially greater resistance to foaming of material would exist near the bottom in comparison to near the top, resulting in a greater proportional foaming and decrease in density near the top during the final stages of the foaming, and consequently forming a foamed core of substantial difference in density between opposite sides.

By the original disposition of bottom edges of sheets 102 and 106 very closely disposed each to the other, in accordance with the invention, a substantially even foaming is permitted as between top and bottom portions by reason of the bottom partially foamed material being able to foam further by spreading apart the bottom edges 118. The upper partially foamed material continues to foam upwardly to the top 112 of the jig 107, all under substantially even resistance. By reason of the fact that the resistance to the final upward foaming action at any point is proportional to the depth or head of material thereabove and accordingly the amount of spreading of the sheets 102 and 106 is also proportional to the depth or distance downward within the jig, by a proper amount of spreading provided for at the bottom, an even resistance to foaming is obtained throughout. Accordingly, if unusually thick foamed cores are desired, the bottom edges of sheets 102 and 106 are initially disposed closer together than the top edges, but not touching one another.

Relatively thick, rigid blocks of urethane foam in accordance with this invention having a density within the range of 1–4 lbs./cu. ft. and preferably 1–2.5 lbs./cu. ft. will have isotropic properties such that the compressive yield strength along all axes will range from about 15–75 p.s.i., and preferably 15–45 p.s.i., with not more than about a 15% variation between the average of the compressive yield strengths along the dimensional perpendicularly related X, Y and Z axes and the individual compressive yield strengths along these axes. The dimensions of these axes, for purposes of claiming, will be referred to as length, height and width. These terms relate to the positions of the block as the foam is placed, for example, in the machine of the second embodiment. The direction of machine travel will be designated as length, and the horizontal dimension transverse to the machine direction will be referred to as width, and the vertical direction referred to as the height. It will be appreciated, of course, that once the block is removed from the conveyor, the orientation of these axes should remain the same for reference purposes, even though in an isotropic foam there would be little, if any, difference in properties in relation to these dimensions.

The acceptable ratios for these dimensions have particular limits, as illustrated herein. Because of the "skin" effect on foam structures, that is, the distortion effect created by the resistance to spreading movement of a mass of newly deposited foaming reactants in the areas nearest the surfaces thereof, there occurs a practical limit of the ratios between length, width and height. Whereas this spreading is not excessive in any direction when the foamable material is deposited in the sinuous pattern shown in FIGURE 3, it can be seen that a relatively low height block with considerable widthwise spread would be considerably affected by this skin effect, which tends to limit the uniformity of the foam and stress the near surface regions of the foam. The ratios of these dimensions are also limited where, because of a very large width, the degree of necessary expansion, which is in proportion to the width, is considerable, and the skin effect will become important in these regions into which the foaming mass is allowed to expand. The more even the ratio of the dimensions, the less significant is the skin effect, both for reasons of uniformity of expansion and because, in a more square cross-section, the near surface regions comprise a smaller proportion of the total volume.

Whereas it is anticipated that the length may be considerable, short lengths may, of course, also be desired. Therefore, the limits in the ratios of these dimensions are (1) a substantial length, i.e., from about ½ of a unit length to any desired length, and (2) a height to width ratio, expressed in the same units, of from about 15:1 to 1:15, and wherein the smallest height dimension is about 2 to 4 inches.

Wide variation in the nature of the isocyanate-derived polymer forming the isotropic foam block of this invention is contemplated with the scope of this invention. Although the invention is illustrated by the foregoing illustrative embodiments, it is evident that other conventional reaction systems, catalysts, blowing agents, post curing operations, fire retardants, and the like, disclosed in the prior art can be employed.

Control of density is normally achieved by varying the amount of blowing agent, as explained herein, and considerable variation in temperature, blowing agents, cure, reactants, and the like, is allowable. Typical physical properties of other isotropic foams of this invention are shown in Table II.

TABLE II

*Rigid urethane foam physical properties and performance characteristics*

|  | Foam B | Foam C | Foam D |
|---|---|---|---|
| Density (lbs./cu. ft.) | 1.8–1.9 | 1.5–1.6 | 1.8–2.0 |
| "k" Factor (B.t.u. in. thickness/° F./hr./sq. ft.) (at mean temperature of 75° F.) | .135 | .15 | .15 |
| Closed Cells (%) | 95 | 90 | 92 |
| Moisture Vapor Permeability (perm.-Inches) | 1.0 | 1.2 | 1.2 |
| Shear Strength (p.s.i.) | 27 | 21 | 23 |
| Shear Modulus (p.s.i.) | 350 | 275 | 350 |
| Compressive Yield Strength (p.s.i.): |  |  |  |
|   Vertical (Height=H) | 26 | 19 | 26 |
|   Horizontal (machine direction) (Lenght=L) | 28 | 17 | 24 |
|   Horizontal (transverse to machine direction) (Width=W) | 32 | 18 | 25 |
| Compressive Modulus (p.s.i.) | 550 | 425 | 550 |
| Coefficient of Linear Expansion: |  |  |  |
|   75° F. to −10° F.: |  |  |  |
|     Machine Direction | .000024 | .000021 | .000021 |
|     Transverse to Machine Direction | −.000047 | −.000031 | −.000031 |
|   75° F. to 200° F.: |  |  |  |
|     Machine Direction | .000040 | .000056 | .000056 |
|     Transverse to Machine Direction | .000067 | .000120 | .000120 |
| Total Water Immersion for 48 Hours (under 10' Head): |  |  |  |
|   Percent Linear Change (max.) | .75 | .4 | .5 |
|   Volume of Water Absorbed (as percent of Foam Volume) | 2.75 | 2.50 | 2.60 |

The foam product of this invention is basically supplied in flat blocks of uniform thickness. Special shapes can readily be fashioned or thin sheets fabricated from the block material using ordinary hand or shop tools. The foam product is recommended for use as low temperature space insulation (coolers and freezers), pipe and equipment insulation (temperature service −320° F. to 250° F.), refrigeration equipment insulation and rail and truck refrigerated equipment insulation; or in structural insulating core for laminated panels (architectural, industrial equipment), military projects requiring structural, low-temperature insulations, and commercial building insulation (perimeter-cavity wall, etc.).

For the purpose of producing a laminated building panel or the like, it is generally more efficient to produce the cellular core by the continuous method, and then later cut the dimensionally stable foam into suitable sizes and laminate the facing sheets to it in a separate operation. However, where the panel or structure sought to be made has a relatively complex shape, such as a corrugated face, it is usually easier to form the entire panel in one operation; the principle of controlling the expansion still governs.

It can be readily appreciated that a novel principle of controlled foaming action underlies all of the apparatus and process embodiments disclosed herein, whether only a block of foam itself is made or whether the foam is contemporaneously incorporated into a unitary structure as a core or other component.

Although polyurethane type foams have been used in the embodiments herein, any resin system capable of being foamed from liquid form into an essentially closed cell, self-supporting structure can be prepared in the apparatus, or by the process described herein. The invention is not limited to any particular foamed resin or any particular formulation. However, polyurethane type foams possess outstanding properties of heat insulation, chemical stability, and physical strength and, therefore, are preferred in the embodiments herein.

Having completed a detailed disclosure of the preferred embodiments of our invention so that those skilled in the art may practice the same, it is contemplated that variations may be made without departing from the essence of the invention or the scope of the appended claims.

We claim:

1. A relatively thick block of a rigid closed cell polyurethane foam having isotropic properties such that the compressive yield strength along all axes will be within the range of about 15–75 p.s.i. with not more than about 20% variation between the average of the compressive yield strengths along the dimensional, mutually perpendicularly related X, Y, and Z axes of said block and the individual compressive yield strengths along these axes, said block having a thickness of not less than about 2" and a height to width ratio within the range of about 15:1 to 1:15.

2. A rigid block of closed cell polyurethane foam in accordance with claim 1 in which the compressive yield strength along all axes will be within the range of about 15–45 p.s.i.

3. A rigid block of polyurethane foam in accordance with claim 2 in which the width to height ratio is within the range of about 10:1 to 1:10.

4. A relatively thick block of a rigid closed cell polyurethane foam having dimensional stability at temperatures below which the blowing agent has at least partly condensed and is exhibiting substantially less vapor pressure than it exhibits in the vapor phase, and having isotropic properties such that the compressive yield strength along all axes will be within the range of about 15–75 p.s.i. with not more than a 20% variation between the average of the compressive yield strengths along the dimensional, mutually perpendicularly related X, Y, and Z axes of said block and the individual compressive yield strengths along these axes, said block having a thickness of not less than about 3" and a height to width ratio within the range of about 15:1 to 1:15, said closed cells being filled with a low boiling point blowing agent.

5. A rigid block of closed cell polyurethane foam in accordance with claim 4 in which said low boiling point blowing agent is a fluorocarbon.

6. A relatively thick block of a rigid closed cell polyurethane foam having dimensional stability at temperatures below which the blowing agent has at least partly condensed and is exhibiting substantially less vapor pressure than it exhibits in the vapor phase, and having isotropic properties such that the compressive yield strength along all axes will be within the range of about 15–45 p.s.i. with not more than a 15% variation between the average of the compressive yield strengths along the dimensional, mutually perpendicularly related X, Y, and Z axes of said block and the individual compressive yield strengths along these axes, said block having a thickness of not less than about 2" and a height to width ratio within the range of about 10:1 to 1:10, said cells being filled with a low boiling point fluorocarbon blowing agent.

7. The method of producing an improved, dimensionally stable, cellular foamed synthetic resin, comprising the steps of mixing the reactants of said synthetic resin, of depositing said foaming resin in liquid form into containing means, of controlling the expansion of the foaming synthetic resin during the foaming period by first allowing a substantial vertical rise, of subsequently restraining the top surface of the foaming mass at a height substantially less than its calculated normal free rise height, of subsequently allowing the remaining expansive forces present in the foaming mass to dissipate themselves, at least partially, by a controlled substantially horizontal expansion, of continuing said horizontal expansion until the desired density is obtained, and of allowing said foamed resin to attain self-supporting consistency, whereby a block of the uniform cellular foam is obtained.

8. The method of claim 7 in which relatively greater horizontal expansion is allowed nearer the bottom of the foaming mass, and relatively less horizontal expansion is allowed nearer the top of the mass.

9. The method of expanding a cellular, foaming synthetic resin, from a liquid form by relieving the pressure from foaming comprising the steps of first allowing an upward, substantially vertical expansion of the foaming mass, of further relieving the internal pressure by a substantially horizontal expansion, said horizontal expansion occurring prior to the exhaustion of the expansive energy of the foaming resin in undergoing vertical rise, whereby a block of synthetic resin foam which has been expanded along at least two substantially perpendicular axes is obtained.

10. The method of claim 7 wherein said reactants are deposited continuously into a feed end of, and removed continuously from a discharge end of, containing and controlling means, wherein directional control of foaming is continuously applied as defined in claim 1 while said foaming reactants are substantially simultaneously moved from said feed end to said discharge end, and wherein said control is applied at least until the mass of foaming resin has become substantially self-supporting and has ceased expanding.

11. The method of making a building panel comprising the steps of disposing two relatively thin dense facing sheets of substantial rigidity substantially vertically in a generally spaced relation tapering outwardly progressively upwardly between two parallel substantially immovable spaced vertical supports, at least one of said sheets being a corrugated asbestos-cement sheet, pouring a foamable mixture of polyol-diisocyanate into the spacing between said two sheets, retaining said foamable mixture in contact with said two sheets during a subsequent self-induced foaming of said foamable mixture, guiding the movement of said foamable mixture during said foaming to form a continuous relatively thick, thermo-set, foam core completely and evenly filling the corrugations of said corrugated facing sheet, allowing the spreading of the relatively closely spaced bottom edges of said two sheets during said foaming, and forming a continuous self-produced adherence of said core to said corrugated facing sheet by the foaming of said foamable mixture while in complete continuous contact therethroughout.

12. A mold for the manufacture of large, rectangular blocks of foamed synthetic resin comprising an outer, substantially box-like frame enclosing an inner forming surface comprising a fixed bottom surface, resiliently mounted inner sidewall surfaces adapted to be displaceable outwardly under internal pressure, a top cover surface disposed across the top of said frame, extending between said sidewalls, locking means able to secure said cover in place, and inner end walls enclosing the ends of said frame and in contact with the bottom and sidewall surfaces, the combination of all of said inner surfaces completely enclosing the space therein.

13. The mold of claim 12 wherein said resiliently mounted inner sidewall surfaces are disposed relatively closer to each other at the bottom and relatively farther apart at the top.

14. The mold of claim 12 wherein said inner sidewall surfaces are adapted to move into a position substantially parallel to each other.

15. An apparatus for producing a dimensionally stable cellular foamed synthetic resin comprising means for containing said resin, means for controlling directionally the expansion of the resin during the foaming, arranged so as to first allow substantial vertical rise, means for subsequently restraining the top surface of the foaming mass at a height substantially less than its calculated normal free rise height, and means for allowing the remaining expansive forces subsequently to be at least partially dissipated by a controlled substantially horizontal expansion.

16. The apparatus of claim 15 wherein the substantially horizontally expansion-permitting means are adapted to allow relatively greater expansion nearer the bottom thereof and relatively less nearer the top thereof.

17. The apparatus of claim 15 wherein said means for allowing substantially horizontal expansion are rigid, resiliently mounted inner sidewalls disposed in a downwardly, inwardly tapering relationship, movably mounted and displaceable outwardly under force so that relatively greater movement is allowed nearer the bottom and relatively less movement nearer the top.

18. An apparatus for producing a dimensionally stable foamed synthetic resin comprising means for depositing reactants forming said synthetic resin, means for containing said deposited resin mixture, means adapted to move said containing means continuously past said depositing means, means adapted to directionally control the expansion of the resin during the foaming thereof, said means arranged to first allow substantial vertical rise, means for subsequently restraining the top surface of the foaming mass at a substantially constant height above a bottom surface, said height being substantially less than its normal calculated free rise height, means for allowing the remaining expansive forces subsequently to dissipate themselves by a substantially horizontal expansion, means for moving said resin expansion-controlling means continuously and means for discharging said foamed resin continuously in a substantially solid state.

19. The method of making a building panel comprising the steps of disposing two relatively thin dense facing sheets of substantial rigidity substantially vertically in a generally spaced relation tapering outwardly progressively upwardly between two parallel substantially immovable spaced vertical supports, at least one of said sheets having a corrugated surface, pouring a foamable mixture of a labile hydrogen-containing resin and a polyisocyanate into the spacing between said two sheets, retaining said foamable mixture in contact with said two sheets during a subsequent self-induced foaming of said foamable mixture, guiding the movement of said foamable mixture during said foaming to form a continuous relatively thick, thermo-set, foam core completely and evenly filling the corrugations of said facing sheet, allowing the spreading of the relatively closely spaced bottom edges of said two sheets during said foaming, and forming a continuous self-produced adherence of said core to said corrugated facing sheet by the foaming of said foamable mixture while in complete continuous contact therethroughout.

20. The method of making a building panel comprising the steps of disposing two relatively thin, dense, facing sheets of substantial rigidity substantially in a generally spaced relationship tapering outwardly progressively upwardly between two parallel, substantially immovable spaced vertical supports, pouring a foamable mixture of a polyol and polyisocyanate into the space between said two sheets, retaining said foamable mixture in contact with said two sheets during a subsequent self-induced foaming of said foamable mixture, guiding the movement of said foamable mixture during said foaming to form a continuous, relatively thick, thermo-set foam core completely and evenly filling the space between, and defined by, said two sheets, allowing spreading of the two relatively closely spaced bottom edges of said sheets during said foaming, and forming a continuous, self-produced adherence of said core to said facing sheets by the foaming of said foamable mixture while in complete, continuous contact therethroughout.

21. The method of making a building panel comprising the steps of disposing two relatively thin dense facing sheets of substantial rigidity substantially vertically in a generally spaced relation tapering outwardly progressively upwardly between two parallel substantially immovable spaced vertical supports, pouring a foamable mixture of a labile-hydrogen-containing resin and a polyisocyanate into the spacing between said two sheets, retaining said foamable mixture in contact with said two sheets during a subsequent self-induced foaming of said foamable mixture, guiding the movement of said foamable mixture during said foaming to form a continuous relatively thick, thermo-setting foam core completely and evenly filling the space between, and defined by, said facing sheets, allowing the spreading of the relatively closely spaced bottom edges of said two sheets during said foaming, and forming a continuous, self-produced adherence of the core to said facing sheets by the foaming of said foamable mixture while in complete continuous contact therethroughout.

References Cited by the Examiner

UNITED STATES PATENTS

| | | | |
|---|---|---|---|
| 1,634,047 | 6/1927 | Smith | 310—66 |
| 2,297,022 | 9/1942 | Pfleumer | 264—52 |
| 2,404,636 | 7/1946 | Humphrey | 264—55 |
| 2,764,516 | 9/1956 | Pace | 264—45 |
| 2,769,205 | 11/1956 | Pfleumer | 264—55 |
| 2,934,807 | 5/1960 | Donati | 264—333 |
| 2,948,926 | 8/1960 | Kuhn | 264—51 |
| 2,978,781 | 4/1961 | Shuman | 25—121 |
| 3,029,472 | 4/1962 | Fischer | 264—52 |
| 3,056,168 | 10/1962 | Terry | 264—55 |
| 3,058,162 | 10/1962 | Grabowski | 264—53 |
| 3,070,842 | 1/1963 | Fuller | 264—331 |
| 3,123,856 | 3/1964 | Dye et al. | 264—47 |

FOREIGN PATENTS 1,205,033   1/1960   France.

OTHER REFERENCES

Dupont Foam Bulletin, "Foam Thickness Affects Its Load Deflection Characteristics," April 29, 1960.

Dupont Foam Bulletin, "Void Filling With Frothed Rigid Urethane Foam," January 16, 1961.

ALEXANDER H. BRODMERKEL, *Primary Examiner.*

MORRIS LIEBMAN, *Examiner.*